(12) United States Patent
Suzuki et al.

(10) Patent No.: US 10,924,716 B2
(45) Date of Patent: Feb. 16, 2021

(54) IMAGE PROJECTION DEVICE

(71) Applicant: QD LASER, INC., Kawasaki (JP)

(72) Inventors: Makoto Suzuki, Kanagawa (JP); Kinya Hasegawa, Kanagawa (JP)

(73) Assignee: QD LASER, INC., Kawasaki (JP)

(*) Notice: Subject to any disclaimer, the term of this patent is extended or adjusted under 35 U.S.C. 154(b) by 0 days.

(21) Appl. No.: 16/340,124

(22) PCT Filed: Sep. 26, 2017

(86) PCT No.: PCT/JP2017/034753
§ 371 (c)(1),
(2) Date: Apr. 7, 2019

(87) PCT Pub. No.: WO2018/070236
PCT Pub. Date: Apr. 19, 2018

(65) Prior Publication Data
US 2020/0014891 A1    Jan. 9, 2020

(30) Foreign Application Priority Data

Oct. 13, 2016  (JP) ................................ 2016-201864

(51) Int. Cl.
*H04N 9/31* (2006.01)
*G02B 17/08* (2006.01)
*G02B 5/20* (2006.01)

(52) U.S. Cl.
CPC ....... *H04N 9/3129* (2013.01); *G02B 17/0804* (2013.01); *H04N 9/3161* (2013.01); *G02B 5/205* (2013.01)

(58) Field of Classification Search
CPC .............. G02B 26/105; G02B 27/0172; G02B 2027/011; G02B 17/0804; G02B 5/205;
(Continued)

(56) References Cited

U.S. PATENT DOCUMENTS 6,081,304 A    6/2000   Kuriyama
2006/0072215 A1   4/2006   Nishi
(Continued)

FOREIGN PATENT DOCUMENTS

CN    101589327 A    11/2009
CN    103592762 A    2/2014
(Continued)

OTHER PUBLICATIONS

Office Action of Japanese Patent Application No. 2016-201864: Notification of Reasons for Refusal dated Jun. 27, 2017 (5 pages, 5 pages translation, 10 pages total).
(Continued)

*Primary Examiner* — Michelle M Iacoletti
*Assistant Examiner* — Danell L Owens
(74) *Attorney, Agent, or Firm* — Kratz, Quintos & Hanson, LLP

(57) ABSTRACT

An image projection device includes: an optical component reflecting an image light beam that has been converted into a substantially parallel light by a lens and scanned by a scanner; a projection mirror irradiating a retina with the reflected image light beam; a light beam blocking unit located on a light path between the scanner and the lens and having an aperture, wherein the projection mirror has a first region and a second region having a larger light condensing power than the first region, and a light condensing power in a third region, reflecting a light beam to be emitted to the first region of the scanned image light beam, of the optical component is greater than that in a fourth region, reflecting a light beam to be emitted to the second region of the scanned image light beam, of the optical component.

12 Claims, 12 Drawing Sheets

(58) Field of Classification Search
CPC .............. G02B 27/4227; G02B 26/101; H04N 9/3129; H04N 9/3161; H04N 5/64; H04N 5/74
See application file for complete search history.

(56) References Cited

U.S. PATENT DOCUMENTS

| | | | |
|---|---|---|---|
| 2008/0212295 | A1 | 9/2008 | Yamamoto |
| 2008/0225291 | A1* | 9/2008 | Konno ...................... G01J 3/04 356/328 |
| 2009/0122545 | A1* | 5/2009 | Uchikawa ............ H04N 9/3129 362/253 |
| 2009/0316115 | A1 | 12/2009 | Itoh |
| 2010/0060551 | A1 | 3/2010 | Sugiyama |
| 2011/0102874 | A1 | 5/2011 | Sugiyama |
| 2013/0265623 | A1* | 10/2013 | Sugiyama .......... G02B 27/0103 359/13 |
| 2014/0049831 | A1 | 2/2014 | Takeda |
| 2015/0205126 | A1 | 7/2015 | Schowengerdt |
| 2016/0103324 | A1* | 4/2016 | Arakawa ................. H04N 3/30 345/690 |
| 2019/0137857 | A1* | 5/2019 | Sugawara .............. G02B 27/02 |

FOREIGN PATENT DOCUMENTS

| | | |
|---|---|---|
| CN | 105264423 A | 1/2016 |
| CN | 105934902 A | 9/2016 |
| JP | 11-109882 A | 4/1999 |
| JP | 11-160650 A | 6/1999 |
| JP | 2006-013127 A | 1/2006 |
| JP | 2006-251509 A | 9/2006 |
| JP | 2008-046253 A | 2/2008 |
| JP | 2009-258686 A | 5/2009 |
| JP | 2010-211148 A | 9/2010 |
| JP | 2011-215194 A | 10/2011 |
| JP | 5216761 B | 6/2013 |
| JP | 2014-048498 A | 3/2014 |
| JP | 2015-111231 A | 6/2015 |
| WO | 2004/029693 A1 | 4/2004 |
| WO | 2010/116726 A1 | 10/2010 |
| WO | 2016/091743 A1 | 6/2016 |
| WO | 2017/056802 A1 | 4/2017 |

OTHER PUBLICATIONS

Office Action of Japanese Patent Application No. 2016-201864: Decision to Grant a Patent dated Aug. 29, 2017 (3 pages, 3 pages translation, 6 pages total).

International Search Report of the International Searching Authority for International Application No. PCT/JP2017/034753 dated Dec. 13, 2017 (10 sheets).

Office Action of Chinese Patent Application No. 201780062365.9 dated Nov. 9, 2020 (7 sheets, 7 sheets translation, 14 sheets total).

* cited by examiner

IMAGE PROJECTION DEVICE

TECHNICAL FIELD

The present invention relates to an image projection device.

BACKGROUND ART

There have been known image projection devices such as head-mounted displays (HMDs) that directly project an image on the retina of the user by using a light beam emitted from a light source. In such image projection devices, the method referred to as Maxwellian view is used. In Maxwellian view, a light beam forming an image is converged near the pupil, and the image is then projected on the retina.

There has been known an image projection device that detects the light reflected by the cornea to adjust the focusing position so that the light beam focuses on the retina (for example, Patent Document 1). There has been also known an image projection device that causes a light emitted from a light source to be reflected by two mirrors with different curvatures in a plane to emit the reflected light to the retina of the user (for example, Patent Documents 2, 3). There has been also known an image projection device in which a stop having a light blocking unit that partially blocks a light and transmissive units that divide the light into partial lights is located on the light path of the light entering into the pupil (for example, Patent Document 4).

PRIOR ART DOCUMENTS

Patent Document

Patent Document 1: Japanese Patent Application Publication No. 2009-258686
Patent Document 2: Japanese Patent Application Publication No. 2008-46253
Patent Document 3: International Publication No. 2004/029693
Patent Document 4: Japanese Patent Application Publication No. 2011-215194

SUMMARY OF THE INVENTION

Problem to be Solved by the Invention

When an image light beam is converged near the pupil with use of a mirror for Maxwellian view, the region where the focusing position greatly deviates from the retina is generated in the image, and it is difficult to provide a good image to the user. For example, when the focusing position is adjusted by the method described in Patent Document 1, the focusing position is adjusted in synchronization with the light beam scanned to form an image. However, it is difficult to adjust the focal point at high speed.

The present invention has been made in view of the above problems, and aims to provide a good image to a user.

Means for Solving the Problem

The present invention is an image projection device including: a light source configured to emit a light beam; an image input unit to which image data is input; a control unit configured to generate an image light beam based on the image data that has been input and control emission of the image light beam from the light source; a lens configured to convert the image light beam emitted from the light source into a substantially parallel light; a scan unit configured to scan the image light beam that has passed through the lens; an optical component configured to reflect the image light beam scanned by the scan unit or allow the image light beam scanned by the scan unit to pass therethrough; a projection mirror configured to irradiate a retina of an eye ball of a user with the image light beam that has been reflected by or has passed through the optical component to project an image on the retina; a light beam blocking unit that is included in a scanning surface of the scan unit, is located on a light path of the image light beam between the scan unit and the lens, and has an aperture that blocks a part of the image light beam and allows a remaining part of the image light beam to pass therethrough, wherein the projection mirror has a first region and a second region that has a larger light condensing power than the first region, and a light condensing power in a third region of the optical component is greater than a light condensing power in a fourth region of the optical component, the third region reflecting a first light beam of the image light beam scanned by the scan unit or allowing the first light beam to pass therethrough, the first light beam being to be emitted to the first region, the fourth region reflecting a second light beam of the image light beam scanned by the scan unit or allowing the second light beam to pass therethrough, the second light beam being to be emitted to the second region.

In the above configuration, the optical component may be a reflection mirror, and a curvature of the reflection mirror in the third region may be greater than a curvature of the reflection mirror in the fourth region.

In the above configuration, the optical component may be a diffraction grating.

In the above configuration, the first region and the second region may be located at both sides of a position corresponding to a center of the image in the projection mirror in an incident direction of the image light beam, and the first region may be located closer than the second region in the incident direction of the image light beam.

The present invention is an image projection device including: a light source configured to emit a light beam; an image input unit to which image data is input; a control unit configured to generate an image light beam based on the image data that has been input and control emission of the image light beam from the light source; a lens configured to convert the image light beam emitted from the light source into a substantially parallel light; a scan unit configured to scan the image light beam that has passed through the lens; a reflection mirror configured to reflect the image light beam scanned by the scan unit; a projection mirror configured to irradiate a retina of an eye ball of a user with the image light beam reflected by the reflection mirror to project an image on the retina; and a light beam blocking unit that is included in a scanning surface of the scan unit, is located on a light path of the image light beam between the scan unit and the lens, and has an aperture that blocks a part of the image light beam and allows a remaining part of the image light beam to pass therethrough, wherein a surface of the projection mirror has a free curved surface having regions with different curvatures, a surface of the reflection mirror has a free curved surface including a concave curved surface and a convex curved surface, and in the projection mirror, a region that reflects an image light beam reflected by the concave curved surface is located closer to a position into which the image light beam enters than a region that reflects an image light beam reflected by the convex curved surface.

The present invention is an image projection device including: a light source configured to emit a light beam; an image input unit to which image data is input; a control unit configured to generate an image light beam based on the image data that has been input and control emission of the image light beam from the light source; a lens configured to convert the image light beam emitted from the light source into a substantially parallel light; a scan unit configured to scan the image light beam that has passed through the lens; a reflection mirror configured to reflect the image light beam scanned by the scan unit; a projection mirror configured to irradiate a retina of an eye ball of a user with the image light beam reflected by the reflection mirror to project an image on the retina; and a light beam blocking unit that is included in a scanning surface of the scan unit, is located on a light path of the image light beam between the scan unit and the lens, and has an aperture that blocks a part of the image light beam and allows a remaining part of the image light beam to pass therethrough, wherein a surface of the projection mirror has a free curved surface having regions with different curvatures, a surface of the reflection mirror has a free curved surface including a concave curved surface and a convex curved surface, and the concave curved surface and the convex curved surface of the reflection mirror are configured so that the image light beam reflected by the concave curved surface is emitted to a region of the projection mirror of which a curvature is less than a curvature of a region of the projection mirror irradiated with the image light beam reflected by the convex curved surface.

The present invention is an image projection device including: a light source configured to emit a light beam; an image input unit to which image data is input; a control unit configured to generate an image light beam based on the image data that has been input and control emission of the image light beam from the light source; a lens configured to convert the image light beam emitted from the light source into a substantially parallel light; a scan unit configured to scan the image light beam that has passed through the lens; a reflection mirror configured to reflect the image light beam scanned by the scan unit; a projection mirror configured to irradiate a retina of an eye ball of a user with the image light beam reflected by the reflection mirror to project an image on the retina; and a light beam blocking unit that is included in a scanning surface of the scan unit, is located on a light path of the image light beam between the scan unit and the lens, and has an aperture that blocks a part of the image light beam and allows a remaining part of the image light beam to pass therethrough, wherein a surface of the projection mirror has a free curved surface having regions with different curvatures, the reflection mirror includes a reflection type diffractive element having a phase distribution with different phase pitches, and in the projection mirror, a region that reflects an image light beam reflected by a region having a phase distribution with a large light condensing power in the reflection type diffractive element is located closer to a position into which the image light beam enters than a region that reflects an image light beam reflected by a region having a phase distribution with a small light condensing power in the reflection type diffractive element.

The present invention is an image projection device including: a light source configured to emit a light beam; an image input unit to which image data is input; a control unit configured to generate an image light beam based on the image data that has been input and control emission of the image light beam from the light source; a lens configured to convert the image light beam emitted from the light source into a substantially parallel light; a scan unit configured to scan the image light beam that has passed through the lens; a reflection mirror configured to reflect the image light beam scanned by the scan unit; a projection mirror configured to irradiate a retina of an eye ball of a user with the image light beam reflected by the reflection mirror to project an image on the retina; and a light beam blocking unit that is included in a scanning surface of the scan unit, is located on a light path of the image light beam between the scan unit and the lens, and has an aperture that blocks a part of the image light beam and allows a remaining part of the image light beam to pass therethrough, wherein a surface of the projection mirror has a free curved surface having regions with different curvatures, the reflection mirror includes a reflection type diffractive element having a phase distribution with different phase pitches, and the phase pitches of the reflection type diffractive element are configured so that an image light beam reflected by a region having a phase distribution with a large light condensing power in the reflection type diffractive element is emitted to a region of the projection mirror of which a curvature is smaller than a curvature of a region of the projection mirror irradiated with an image light beam reflected by a region having a phase distribution with a small light condensing power in the reflection type diffractive element.

The present invention is an image projection device including: a light source configured to emit a light beam; an image input unit to which image data is input; a control unit configured to generate an image light beam based on the image data that has been input and control emission of the image light beam from the light source; a lens configured to convert the image light beam emitted from the light source into a substantially parallel light; a scan unit configured to scan the image light beam that has passed through the lens; an optical component configured to allow the image light beam scanned by the scan unit to pass therethrough; a projection mirror configured to irradiate a retina of an eye ball of a user with the image light beam that has passed through the optical component to project an image on the retina; and a light beam blocking unit that is included in a scanning surface of the scan unit, is located on a light path of the image light beam between the scan unit and the lens, and has an aperture that blocks a part of the image light beam and allows a remaining part of the image light beam to pass therethrough, wherein a surface of the projection mirror has a free curved surface having regions with different curvatures, the optical component includes a transmissive diffractive element having a phase distribution with different phase pitches, and in the projection mirror, a region that reflects an image light beam that has passed through a region having a large light condensing power in the transmissive diffractive element is located closer to a position into which the image light beam enters than a region that reflects an image light beam that has passed through a region having a small light condensing power in the transmissive diffractive element.

The present invention is an image projection device including: a light source configured to emit a light beam; an image input unit to which image data is input; a control unit configured to generate an image light beam based on the image data that has been input and control emission of the image light beam from the light source; a lens configured to convert the image light beam emitted from the light source into a substantially parallel light; a scan unit configured to scan the image light beam that has passed through the lens; an optical component configured to allow the image light beam scanned by the scan unit to pass therethrough; a projection mirror configured to irradiate a retina of an eye ball of a user with the image light beam that has passed through the optical component to project an image on the retina; and a light beam blocking unit that is included in a scanning surface of the scan unit, is located on a light path of the image light beam between the scan unit and the lens, and has an aperture that blocks a part of the image light beam and allows a remaining part of the image light beam to pass therethrough, wherein a surface of the projection mirror has a free curved surface having regions with different curvatures, the optical component includes a transmissive diffractive element having a phase distribution with different phase pitches, and the phase pitches of the transmissive diffractive element are configured so that an image light beam that has passed through a region having a phase distribution with a large light condensing power in the transmissive diffractive element is emitted to a region of the projection mirror of which a curvature is smaller than a curvature of a region of the projection mirror irradiated with an image light beam that has passed through a region having a phase distribution with a small light condensing power in the transmissive diffractive element.

In the above configuration, a neutral density filter that is located on a light path of the image light beam between the light source and the eye ball, and reduces an intensity of the image light beam may be provided.

In the above configuration, the neutral density filter may be located between the lens and the scan unit.

Effects of the Invention

The present invention can provide a good image to a user.

EMBODIMENTS FOR CARRYING OUT THE INVENTION

Hereinafter, with reference to the drawings, embodiments of the present invention will be described.

First Embodiment

Figure 1:
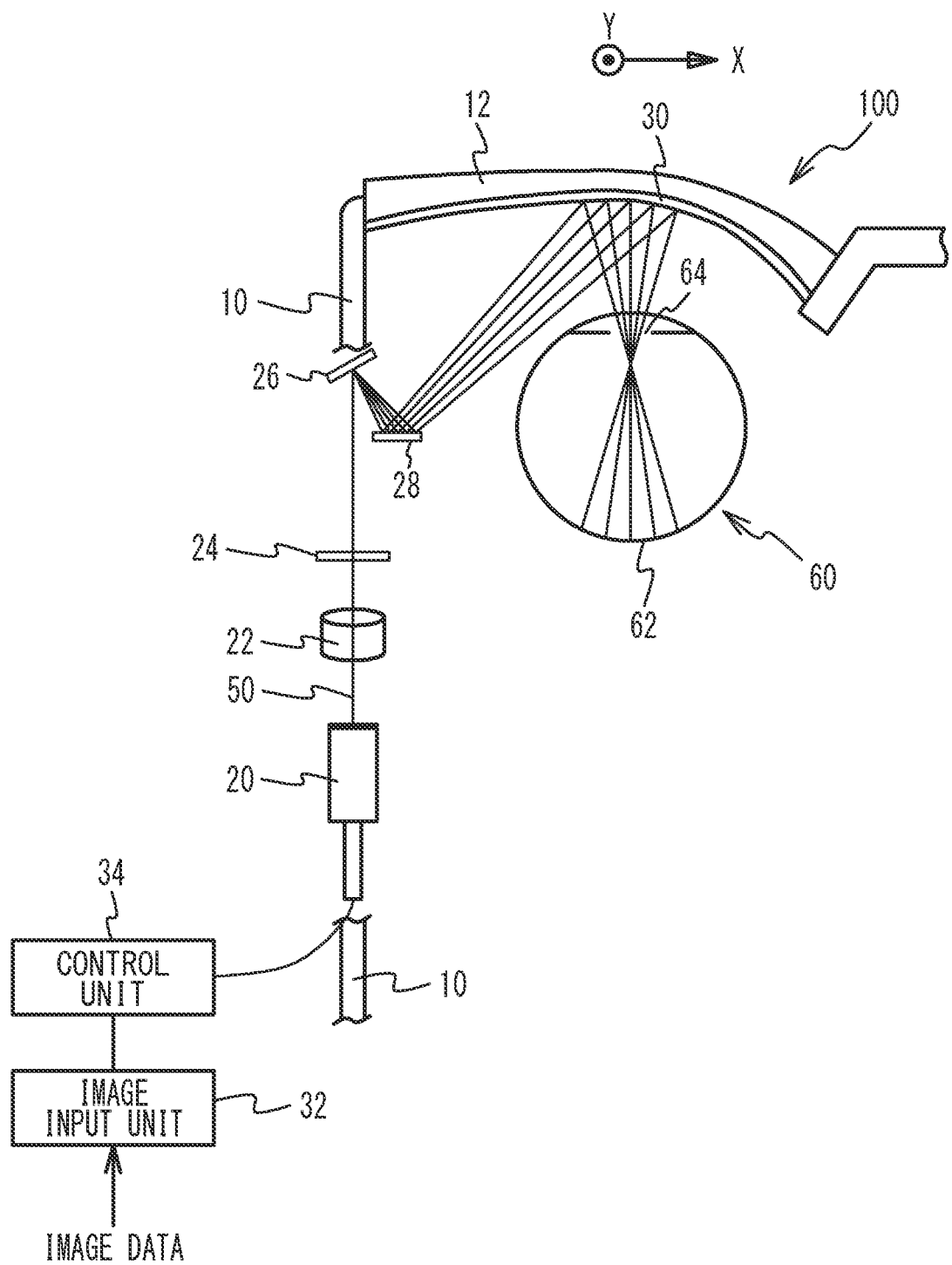
FIG. 1 illustrates an image projection device in accordance with a first embodiment as viewed from above.
Figure 2:
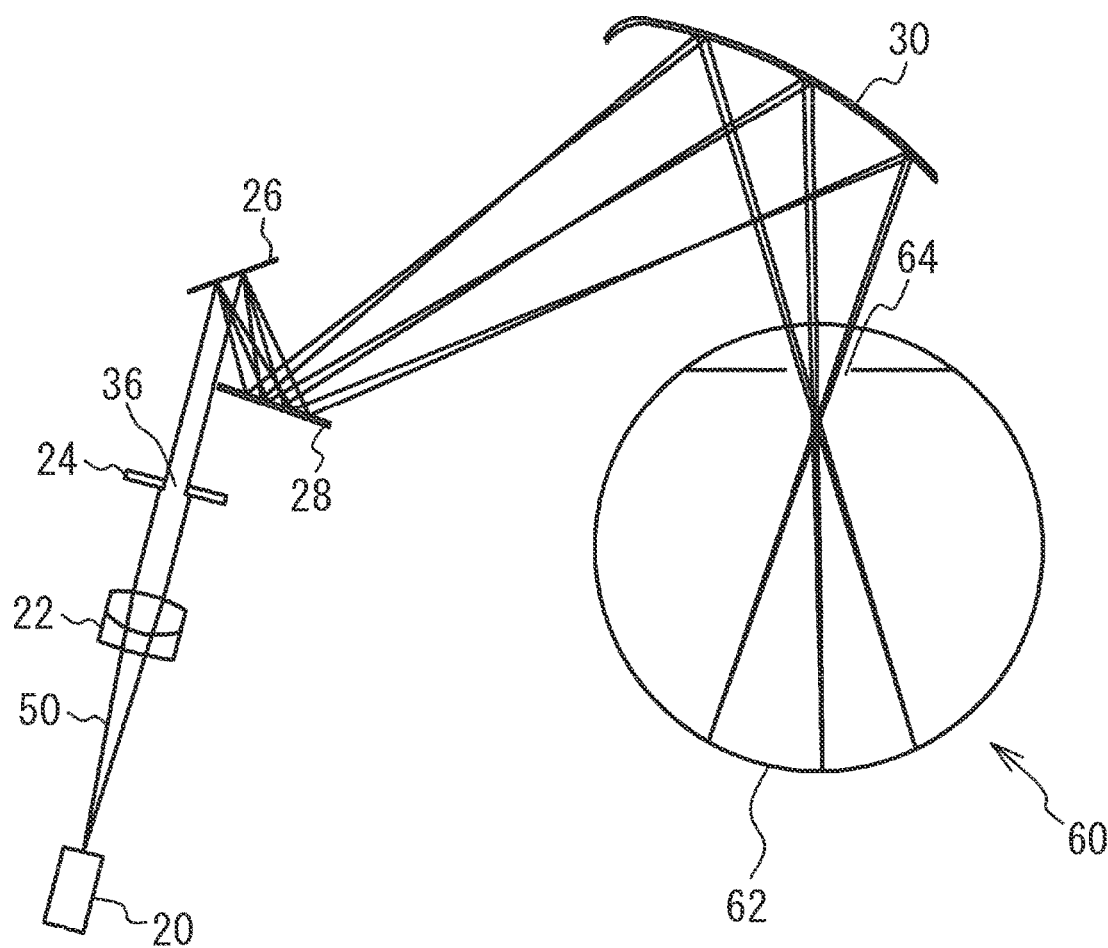
FIG. 2 is an enlarged view of a part of the image projection device in accordance with the first embodiment as viewed from above.

FIG. 1 illustrates an image projection device in accordance with a first embodiment as viewed from above. FIG. 2 is an enlarged view of a part of the image projection device in accordance with the first embodiment as viewed from above. A direction in which a light beam that has entered the projection mirror 30 travels in the projection mirror 30 is defined as an X direction, and a direction perpendicular to the X direction in the projection mirror 30 is defined as a Y direction. In the following example, the X direction corresponds to a horizontal direction.

As illustrated in FIG. 1 and FIG. 2, an image projection device 100 of the first embodiment includes a light source 20, a lens 22, a light beam blocking unit 24, a scan mirror 26, a reflection mirror 28, a projection mirror 30, an image input unit 32, and a control unit 34. The image projection device 100 of the first embodiment is a spectacle type. Spectacles include a temple 10 and a lens 12. The temple 10 of the spectacles is provided with the light source 20, the lens 22, the light beam blocking unit 24, the scan mirror 26, and the reflection mirror 28. The lens 12 of the spectacles is provided with the projection mirror 30. The image input unit 32 and the control unit 34 may not be necessarily located in the spectacles, and may be located in an external device (for example, a mobile terminal), and may be located in the temple 10 of the spectacles.

Image data is input to the image input unit 32 from a camera and/or a recording device that are not illustrated. The control unit 34 controls the emission of a laser beam 50 from the light source 20 on the basis of the image data that has been input. The light source 20 emits, for example, the laser beam 50 of a single wavelength or the laser beam 50 of a plurality of wavelengths under the control by the control unit 34. That is, the image data is converted by the light source 20 into the laser beam 50 that is an image light beam. The control unit 34 is a processor such as, for example, a central processing unit (CPU). When a camera is installed in an appropriate position in the image projection device 100 to be directed in the eye direction of an eye ball 60, the image in the eye direction captured by the camera can be projected on a retina 62. So-called augmented reality (AR) images can be projected by projecting the image input from the recording device or superimposing the camera image on the image from the recording device by the control unit 34.

The lens 22 is a collimating lens that converts the laser beam 50 emitted from the light source 20 to a substantially parallel laser beam.

The light beam blocking unit 24 is located on the light path of the laser beam 50 between the lens 22 and the scan mirror 26. The laser beam 50 that has been converted into a substantially parallel light by the lens 22 enters the light beam blocking unit 24. A part of the laser beam 50 that has entered the light beam blocking unit 24 is blocked by the light beam blocking unit 24, and the remaining part passes through an aperture 36 located in the light beam blocking unit 24. That is, the light beam blocking unit 24 has the aperture 36 that blocks a part of the laser beam 50 and allows the remaining part to pass therethrough. The aperture 36 of the light beam blocking unit 24 has, for example, a substantially circular shape. The substantially circular shape is not limited to a complete circular shape, and includes a circular shape of which a part of the outer periphery distorts and an elliptical shape. The center of the aperture 36 is substantially aligned with the optical axis of the laser beam 50. The diameter of the aperture 36 is configured so that the diameter of the laser beam 50 when the laser beam 50 that has passed through the light beam blocking unit 24 enters the scan mirror 26 is less than the effective diameter of the scan mirror 26. For example, the diameter of the aperture 36 is equal to or less than the diameter at the intensity of $1/e^2$ of the laser beam 50 that has been converted to a substantially parallel light by the lens 22.

The scan mirror 26 scans the laser beam 50 that has passed through the light beam blocking unit 24 in the two-dimensional direction to form a projection light for projecting an image onto the retina 62 of the eye ball 60 of the user. The scan mirror 26 is, for example, a Micro Electro Mechanical System (MEMS) mirror, and scans the laser beam 50 in the horizontal direction and the vertical direction. In the following example, the directions in which the laser beam 50 is scanned are defined as the X direction and the Y direction, but the laser beam 50 may be scanned in the directions other than the X direction and the Y direction.

The reflection mirror 28 reflects the laser beam 50 that has been scanned by the scan mirror 26 toward the lens 12 of the spectacles. The projection mirror 30 is located on the surface, closer to the eye ball 60 of the user, of the lens 12 of the spectacles. The projection mirror 30 irradiates the retina 62 of the eye ball 60 of the user with the laser beam 50, which has been scanned by the scan mirror 26 and reflected by the reflection mirror 28, to project an image on the retina 62. That is, the user recognizes the image by the afterimage effect of the laser beam 50 projected on the retina 62. The projection mirror 30 is designed so that the convergence position of the laser beam 50 scanned by the scan mirror 26 is in the vicinity of a pupil 64 of the eye ball 60. The laser beam 50 enters the projection mirror 30 substantially from the side (i.e., substantially in the X direction). The projection mirror 30 is not necessarily in contact with the lens 12 of the spectacles, and may be located in the location from which the laser beam 50 can be emitted to the retina 62 through the pupil 64 of the eye ball 60. Depending on use application, only the projection mirror 30 may be provided and the lens 12 of the spectacles may be omitted.

Figure 3A:
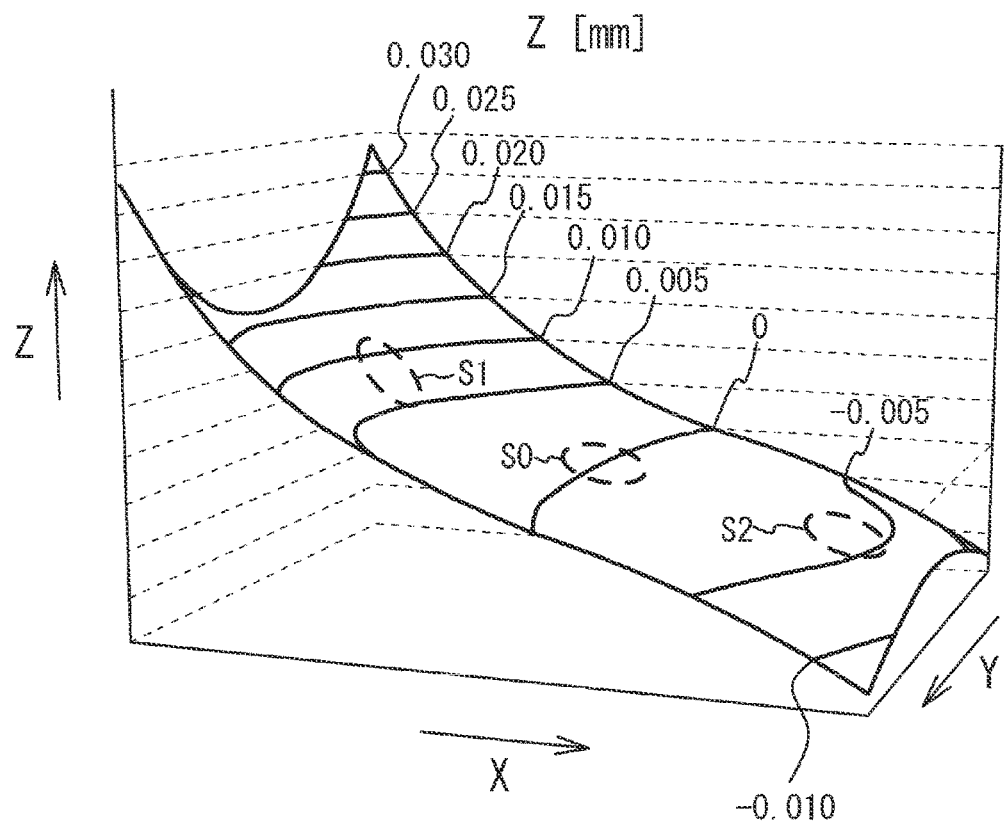
FIG. 3A is a perspective view illustrating a surface of a reflection mirror included in the image projection device in accordance with the first embodiment.
Figure 3B:
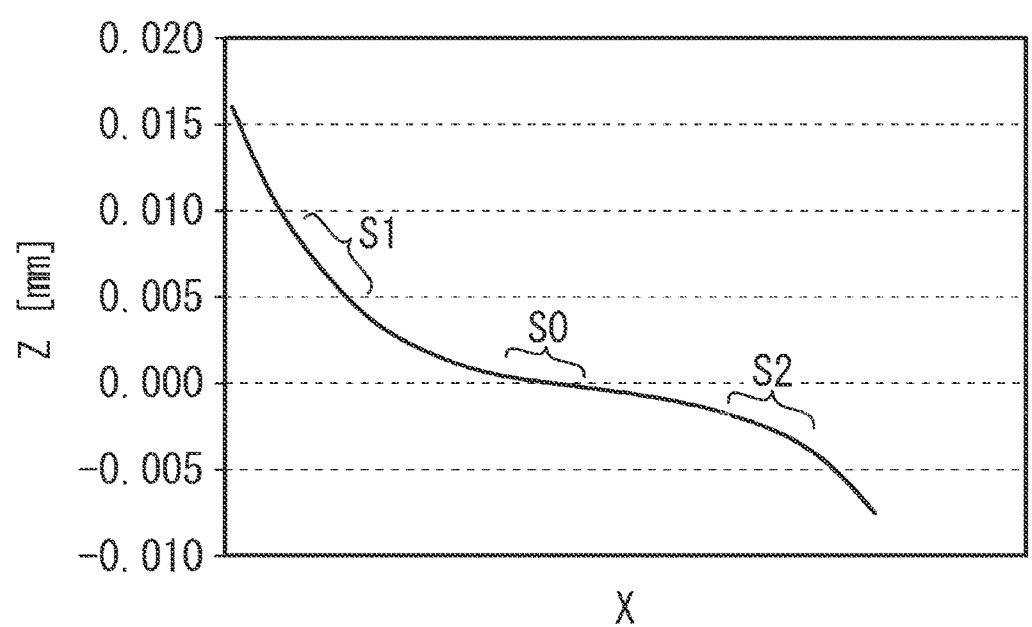
FIG. 3B is a diagram illustrating a height Z in an X direction of the reflection mirror.

FIG. 3A is a perspective view illustrating the surface of the reflection mirror included in the image projection device in accordance with the first embodiment, and FIG. 3B illustrates the height Z in the X direction of the reflection mirror. The X direction and the Y direction correspond to the X direction and the Y direction in the projection mirror 30, respectively. The height in the reflection mirror 28 corresponds to the Z direction. In FIG. 3A, the level difference on the surface of the reflection mirror 28 in the Z direction is enlarged As illustrated in FIG. 3A and FIG. 3B, the reflection mirror 28 has a substantially planar surface in a region S0, a concave surface in a region S1, and a convex surface in a region S2. Accordingly, the light condensing power is approximately 0 in the region S0, positive in the region S1, and negative in the region S2. Z on the surface of the reflection mirror 28 is expressed by the following expression, and the surface of the reflection mirror 28 is a free curved surface.

$Z = \Sigma a_{ij} \times X^i \times Y^j$

The origin (X=0, Y=0) corresponds to the center of the image, and corresponds to, for example, the vicinity of the region S0. Here, $a_{ij}$ is a coefficient. To differ the light condensing power in the X direction, at least one of the coefficients $a_{ij}$ of which i is an odd number is set at a finite value (except 0). The light condensing power in the Y direction in the projection mirror 30 is symmetrical about the X-axis. Thus, the coefficient $a_{ij}$ of which j is an odd number is set at 0. For example, the coefficients $a_{30}$ and $a_{12}$ are set at finite values. This configuration achieves the free curved surface such as FIG. 3A and FIG. 3B. To further adjust the free curved surface of the reflection mirror 28, the coefficient $a_{10}$ and/or $a_{20}$ may be set at a finite value. Furthermore, the high-order coefficient may be set at a finite value.

Figure 4:
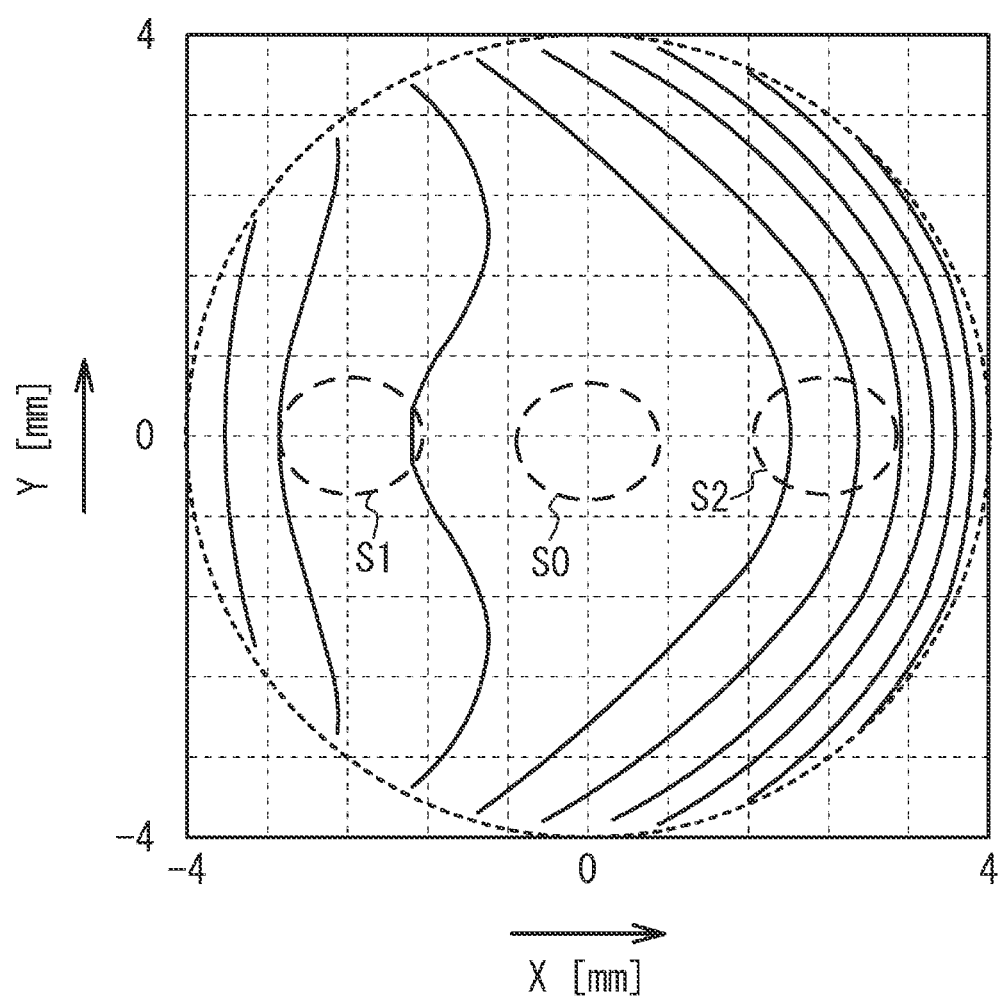
FIG. 4 illustrates contour lines of the reflection mirror included in the image projection device in accordance with the first embodiment.

FIG. 4 illustrates contour lines of the reflection mirror included in the image projection device in accordance with the first embodiment. In FIG. 4, Z at the center (X, Y)=(0, 0) is 0. The interval between the contour lines is 11.6 μm. Z decreases at farther distances from the center in the +X direction, and Z increases at farther distances from the center in the −X direction. FIG. 4 is a circle because the simulation was conducted on the basis of the retina. FIG. 3A corresponds to a part that is cut out as a rectangle from the circle of FIG. 4.

Figure 5:
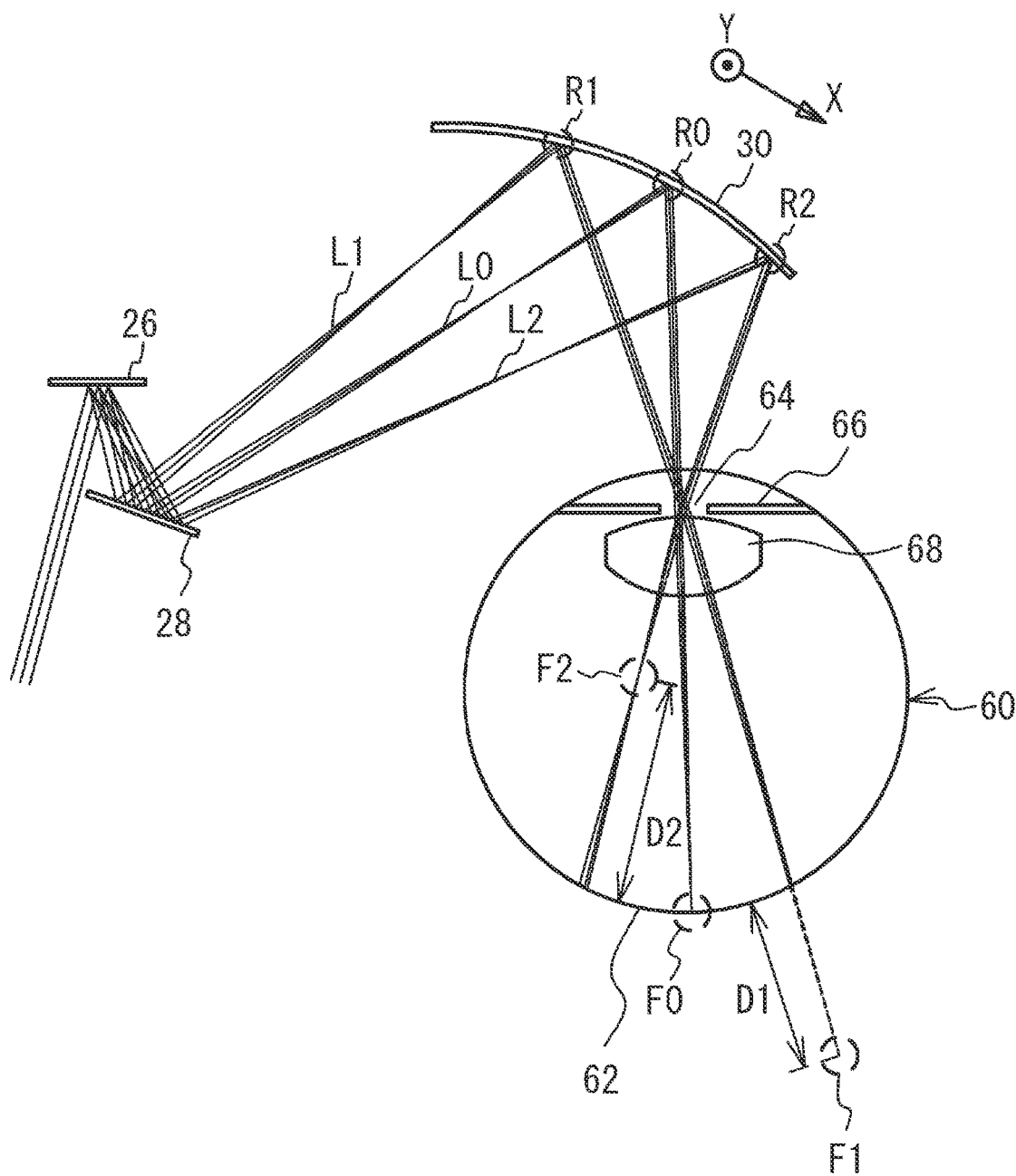
FIG. 5 illustrates a light path of a laser beam in an image projection device in accordance with a comparative example.

Here, before describing the advantages of the image projection device 100 of the first embodiment, an image projection device of a comparative example will be described. The image projection device of the comparative example has the same structure as the image projection device 100 of the first embodiment except that the entire surface of the reflection mirror 28 is flat. FIG. 5 illustrates the light path of a laser beam in the image projection device of the comparative example. In FIG. 5, a light beam L0 through a light beam L2 are light beams scanned in the horizontal direction by the scan mirror 26, and emitted to the projection mirror 30 from the −X direction. The light beam L0 is a light beam corresponding to the center of the image, and the light beam L1 and the light beam L2 are light beams corresponding to the ends of the image. The light beam L0 through the light beam L2 are respectively reflected by a region R0 through a region R2 of the projection mirror 30. The reflected light beam L0 through the reflected light beam L2 are converged near the pupil 64 located in the center portion of an iris 66, pass through a crystalline lens 68 and then reach the retina 62. The region R0 is a region that reflects the light beam L0 corresponding to the center of the image. The region R1 is located at the −X direction side of the region R0. The region R2 is located at the +X direction side of the region R0. For Maxwellian view, the light beam L0 through the light beam L2 intersect with each other near the pupil 64.

In FIG. 5, it is assumed that the light beam L0 reflected by the projection mirror 30 enters the crystalline lens 68 as a substantially parallel light, and focuses near the retina 62. That is, it is assumed that the focusing position F0 of the light beam L0 is in the vicinity of the retina 62. In this case, the light beam L1 reflected by the projection mirror 30 enters the crystalline lens 68 as a diffusion light. Thus, the light beam L1 focuses at the position behind the retina 62. The light beam L2 reflected by the projection mirror 30 enters the crystalline lens 68 as a converging light. Thus, the light beam L2 focuses at the position before the retina 62. When the light beam L0 is made to focus near the retina 62, the focusing position F1 of the light beam L1 is the position farther than the retina 62 from the projection mirror 30, and the distance between the retina 62 and the focusing position F1 is D1. The focusing position F2 of the light beam L2 is the position closer to the projection mirror 30 than the retina 62, and the distance between the focusing position F2 and the retina 62 is D2.

The reason why the focusing position F0 through the focusing position F2 differ as described above is as follows. When the light beam L0 through the light beam L2 that have entered the projection mirror 30 from the −X direction are attempted to converge near the pupil 64, the curvature of the projection mirror 30 differs in the X direction among the region R0 through the region R2 and/or the optical path difference among the light beam L0 through the light beam L2 is caused. For example, the region R2 has a larger curvature than the region R1. That is, the light condensing power in the region R2 is greater than the light condensing power in the region R1. Thus, the focusing position F2 is located closer to the light source than the focusing position F1 is. In addition, when the projection mirror 30 is arranged in parallel with the face of the user, the light path of the light beam L2 is longer than that of the light beam L1. Accordingly, the focusing position F2 is located closer to the light source than the focusing position F1 is. As described above, in the comparative example, when the light beam L0 through the light beam L2 are made to converge near the pupil 64 for Maxwellian view, the region in which the focusing position greatly deviates from the retina 62 is generated in the image. The optical system in the Y direction is substantially symmetrical about the X-axis, and the deviation of the focusing position hardly occurs in the Y direction unlike in the X direction.

Figure 6A:
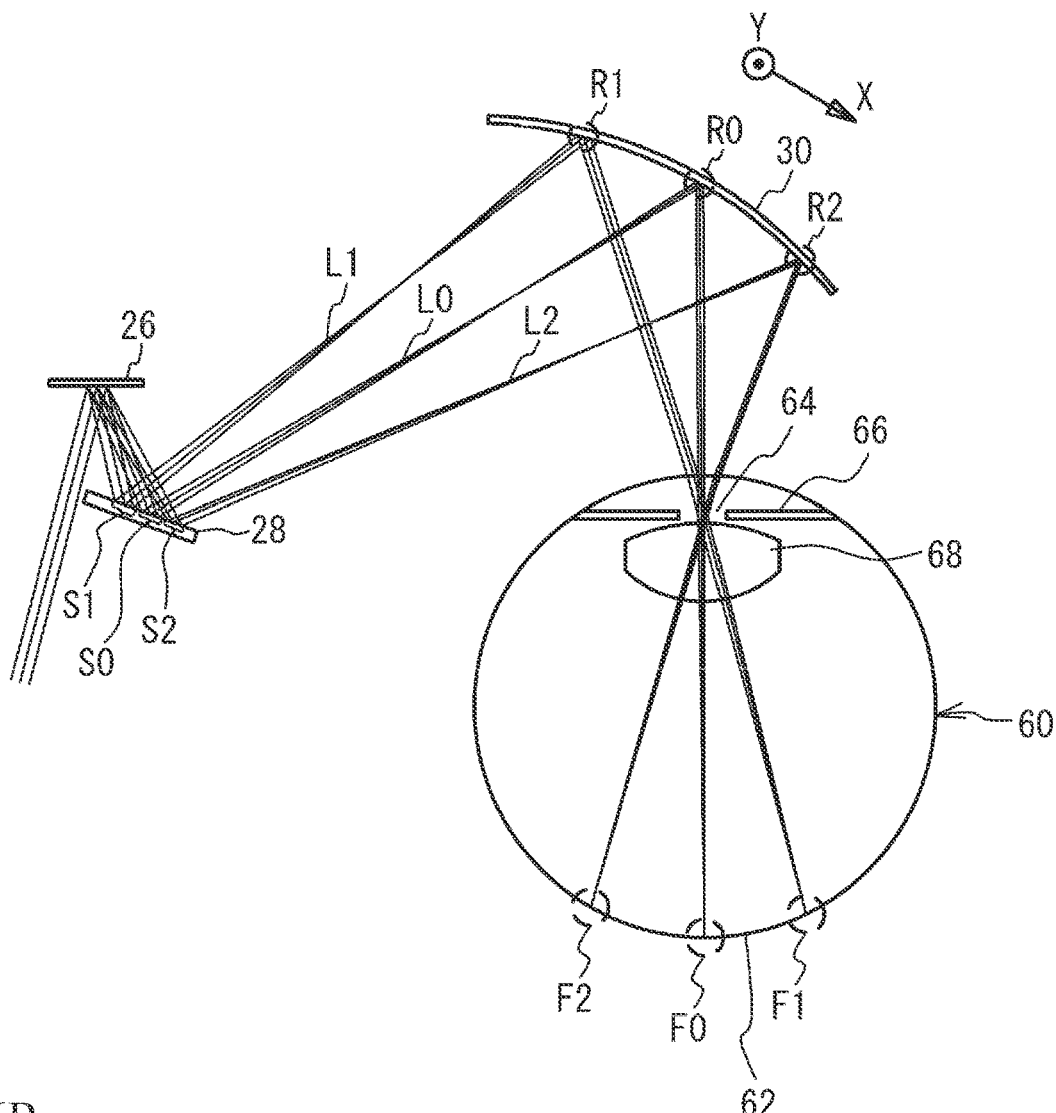
FIG. 6A illustrates a light path of a laser beam in the image projection device in accordance with the first embodiment.
Figure 6B:
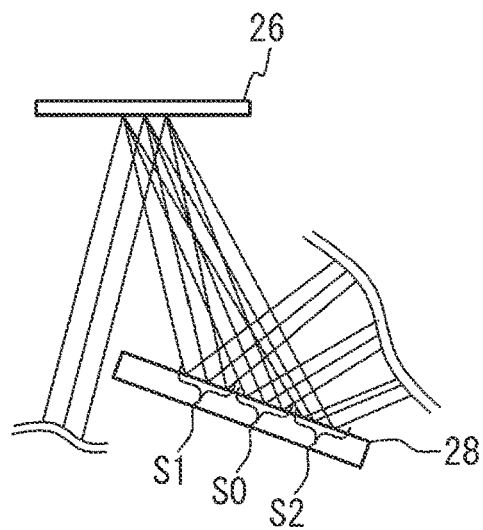
FIG. 6B is an enlarged view of the vicinity of the reflection mirror in FIG. 6A.

FIG. 6A is a diagram illustrating a light path of the laser beam in the image projection device in accordance with the first embodiment, and FIG. 6B is an enlarged view of the vicinity of the reflection mirror in FIG. 6A. As illustrated in FIG. 6A and FIG. 6B, the light beam L0 through the light beam L2 respectively emitted to the region R0 through the region R2 of the projection mirror 30 are respectively reflected by the region S0 through the region S2 in the reflection mirror 28. As described in FIG. 3A through FIG. 4, the reflection mirror 28 has a light condensing power of approximately 0 in the region S0 having a substantially planar surface, has a positive light condensing power in the region S1 having a concave surface, and has a positive light condensing power in the region S2 having a convex surface. Because of this structure, the region R2, which has a large curvature, of the projection mirror 30 is irradiated with the light beam L2 reflected by the region S2, which has a small light condensing power, of the reflection mirror 28, and the region R1, which has a small curvature, of the projection mirror 30 is irradiated with the light beam L1 reflected by the region S1, which has a large light condensing power, of the reflection mirror 28. This configuration allows all the light beam L0 through the light beam L2 to focus near the retina 62.

As described above, in the first embodiment, the surface of the reflection mirror 28 is a free curved surface having a planar surface, a concave surface, and a convex surface corresponding to the change in the curvature of the free curved surface of the projection mirror 30. The concave curved surface and the convex curved surface of the reflection mirror 28 are configured so that the light beam L1 reflected by the concave surface (the region S1) of the reflection mirror 28 is emitted to the region R1 of the projection mirror 30, which has a smaller curvature than the region R2 of the projection mirror 30 irradiated with the light beam L2 reflected by the convex surface (the region S2). In other words, in the reflection mirror 28, the light condensing power in the region S1, which reflects the light beam L1 to be emitted to the region R1 of the projection mirror 30, is greater than the light condensing power in the region S2, which reflects the light beam L2 to be emitted to the region R2 of the projection mirror 30, which has a greater light condensing power than the region R1. This configuration allows the light beam L0 through the light beam L2 to focus near the retina 62 as illustrated in FIG. 6A. In addition, as illustrated in FIG. 2, the light beam blocking unit 24 having the aperture 36 that blocks a part of the laser beam 50 and allows the remaining part of the laser beam 50 to pass therethrough is located on the light path of the laser beam 50 between the lens 22 and the scan mirror 26. This structure allows the laser beam 50 to enter the scan mirror 26 to have an appropriate diameter, and the optical intensity at the edge of the laser beam 50 (the intensity at the edge of the pupil) is increased. These configurations allow a good image to be provided to the user.

In addition, since the laser beam 50 that has passed through the light beam blocking unit 24 and then scanned by the scan mirror 26 enters the reflection mirror 28, the diameter of the laser beam 50 entering into the reflection mirror 28 is adjusted to an appropriate diameter. Thus, the reflection mirror 28 gives an appropriate light condensing power to the laser beam 50.

For example, the optical system including the projection mirror 30 is designed under the assumption that the reflection mirror 28 has a planar surface without taking the focusing position F0 through the focusing position F2 of the light beam L0 through the light beam L2 into consideration. Then, without changing the design of the projection mirror 30, the surface of the reflection mirror 28 is designed as a free curved surface. Through this design process, the focusing position F0 through the focusing position F2 of the light beam L0 through the light beam L2 are adjusted. Since the light condensing powers given to the light beam L0 through the light beam L2 by the reflection mirror 28 are weak, the reflection mirror 28 hardly affects the trajectories of the light beam L0 through the light beam L2, and the focusing position F0 through the focusing position F2 are thus adjusted. Therefore, the optical system can be easily designed.

Figure 7:
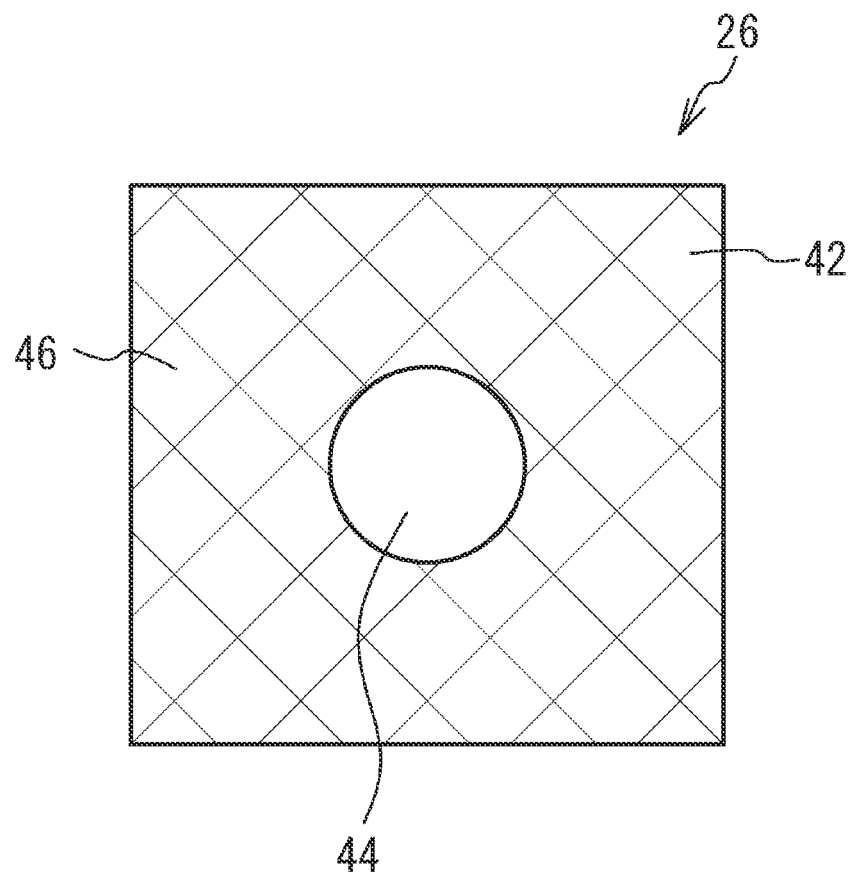
FIG. 7 illustrates another example of a light beam blocking unit.

FIG. 7 illustrates another example of the light beam blocking unit. As illustrated in FIG. 7, a region except an effective diameter 44 on a scanning surface 42 of the scan mirror 26 is an absorption part 46 formed of a material that does not reflect the laser beam 50 but absorbs the laser beam 50, and the scanning surface 42 may function as the light beam blocking unit. As described above, it is sufficient if the light beam blocking unit is located on the light path of the laser beam 50 between the scan mirror 26 and the lens 22, and the light beam blocking unit may be included in the scanning surface 42 of the scan mirror 26.

The region R1 and the region R2 of the projection mirror 30 are located at both sides of the position corresponding to the center of the image in the projection mirror 30 (the region R0) in the incident directions of the light beam L0 through the light beam L2. The region R1 is located closer to the optical component (the reflection mirror 28) than the region R2 in the incident directions of the light beam L0 through the light beam L2. When the region R0 through the region R2 are arranged in this manner, in the comparative example, the deviation of the focusing position F0 through the focusing position F2 from the retina 62 is large as illustrated in FIG. 5. Thus, the light condensing powers of the region S0 through the region S2 of the reflection mirror 28 are preferably made to be different.

Furthermore, the distance between the region R1 and the region R2 in the projection mirror 30 is greater than the distance between the region S1 and the region S2 in the reflection mirror 28. In the optical system in which the distance between the region R1 and the region R2 is large, when the light beam L0 through the light beam L2 are attempted to converge near the pupil 64, the light condensing powers of the region R1 and the region R2 are made to be largely different. Thus, the light paths of the light beam L0 through the light beam L2 largely differ. This configuration causes the large deviation of the focusing position F1 through the focusing position F2 from the retina 62. Thus, in such an optical system, the light condensing powers in the region S1 and the region S2 of the reflection mirror 28 are preferably made to be different.

In addition, the distance D1 between the focusing position F1 at which the light beam L1 focuses and the retina 62 and the distance D2 between the focusing position F2 at which the light beam L2 focuses and the retina 62 are respectively smaller than the distances D1 and D2 when the light condensing powers in the regions S1 and the region S2 of the reflection mirror 28 are assumed to be the same. Accordingly, the focusing position F0 through the focusing position F2 of the light beam L0 through the light beam L2 can be configured to be in the vicinity of the retina 62.

In addition, in the first embodiment, with use of the reflection mirror 28, the light condensing powers of the region S1 and the region S2 are configured by configuring the curvature in the region S1 to be greater than the curvature in the region S2. This configuration allows the light condensing power in the region S1 to be greater than the light condensing power in the region S2. The curvature of the concave surface is defined as being positive as in the region S1 and the curvature of the convex surface is defined as being negative as in the region S2 as illustrated in FIG. 3A and FIG. 3B. In addition, even when the light beam L0 through the light beam L2 contain a plurality of wavelengths, the use of the reflection mirror 28 allows the light condensing powers of the light beams L0 through the light beams L2 of the individual wavelengths to be set with use of a single curved surface.

Second Embodiment

Figure 8A:
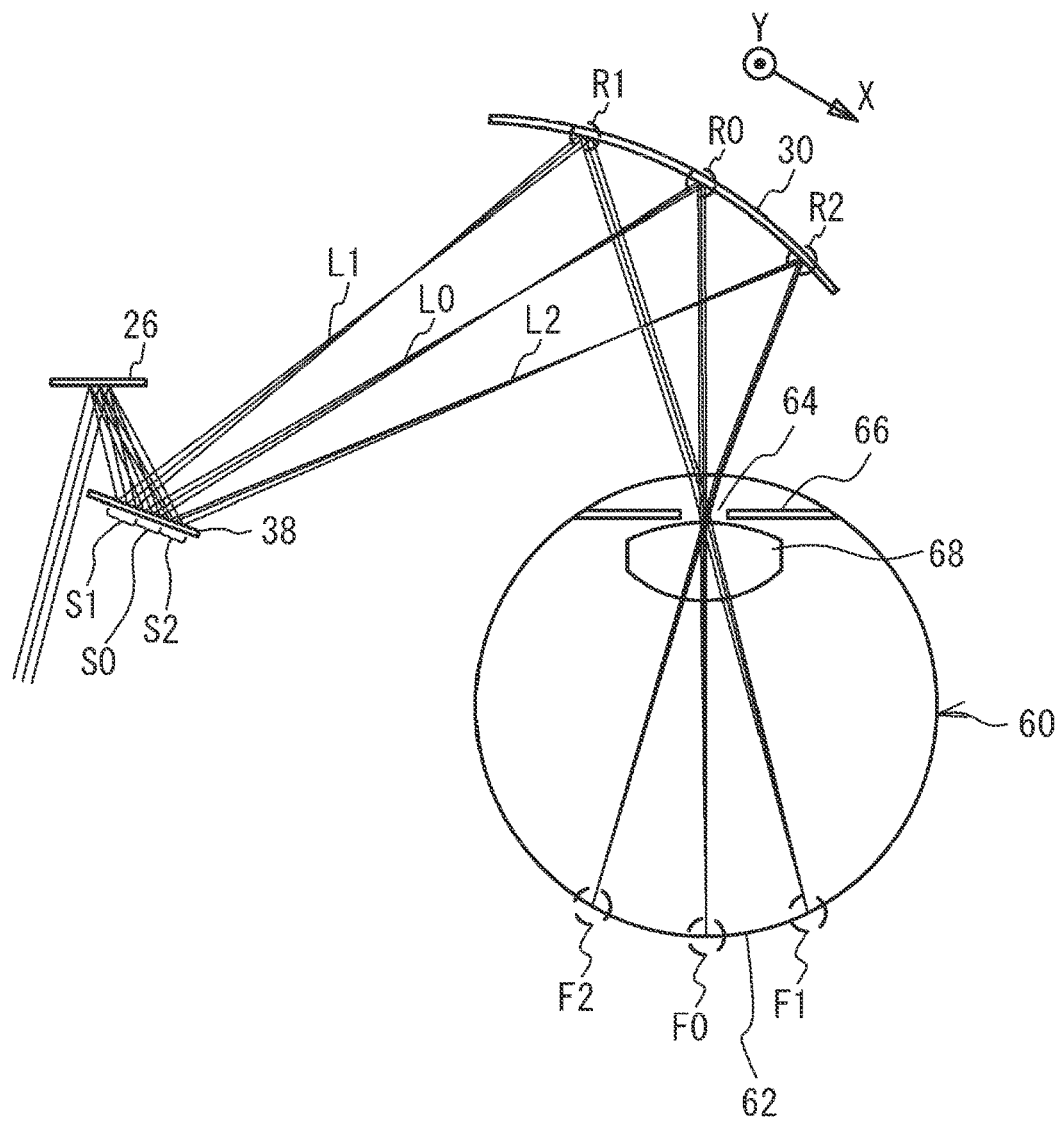
FIG. 8A illustrates a light path of a laser beam in an image projection device in accordance with a second embodiment.
Figure 8B:
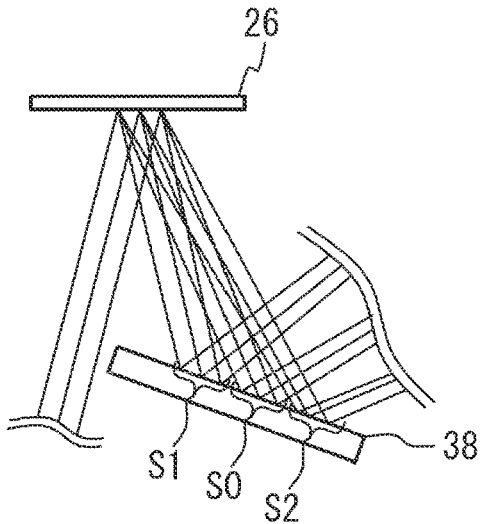
FIG. 8B is an enlarged view of the vicinity of a reflection type diffraction grating in FIG. 8A.

An image projection device of a second embodiment is the same as the image projection device 100 of the first embodiment except that a reflection type diffraction grating 38 is used instead of the reflection mirror 28. FIG. 8A illustrates a light path of a laser beam in the image projection device in accordance with the second embodiment, and FIG. 8B is an enlarged view of the vicinity of the reflection type diffraction grating in FIG. 8A. As illustrated in FIG. 8A and FIG. 8B, the image projection device of the second embodiment includes the reflection type diffraction grating 38 instead of the reflection mirror 28, and the light beam L0 through the light beam L2 scanned by the scan mirror 26 are reflected by the region S0 through the region S2 of the reflection type diffraction grating 38 and then enter the projection mirror 30.

Figure 9:
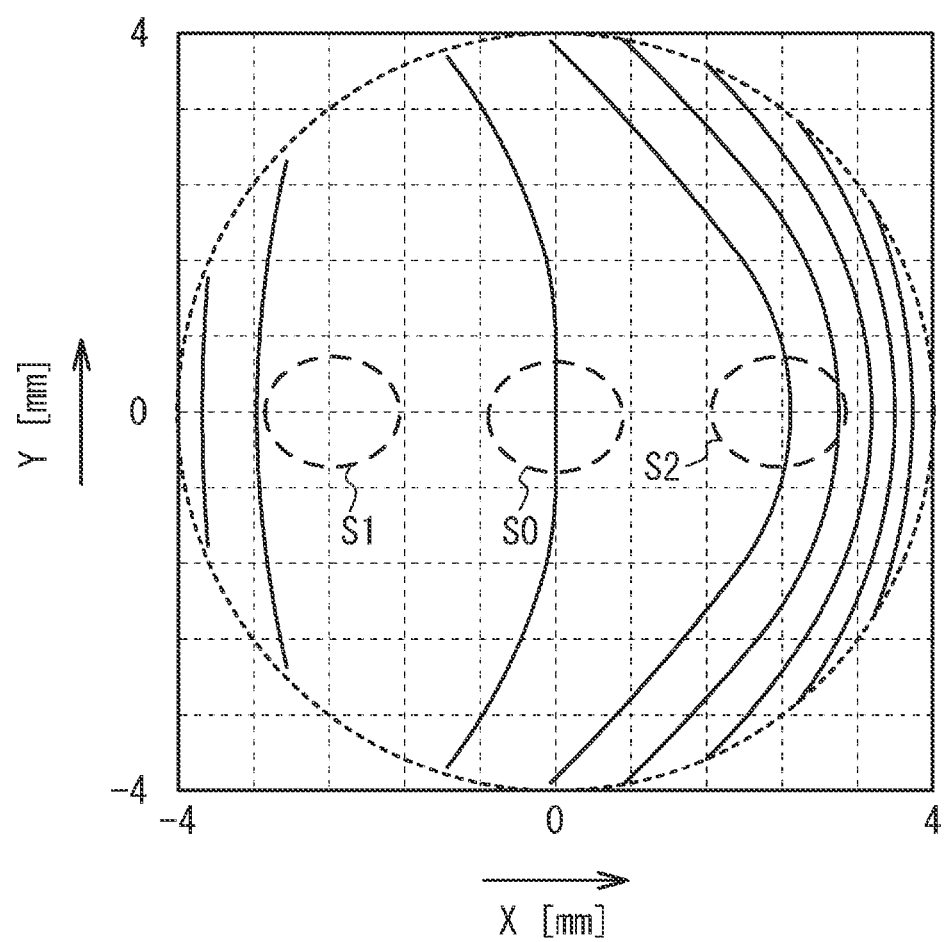
FIG. 9 illustrates equiphase lines of the reflection type diffraction grating included in the image projection device of the second embodiment.

FIG. 9 illustrates equiphase lines of the reflection type diffraction grating included in the image projection device in accordance with the second embodiment. In FIG. 9, the interval between lines is 50×2 π rad. The interval between equiphase lines corresponds to the pitch of the reflection type diffraction grating 38. The use of the reflection type diffraction grating 38 also allows the light condensing power of the region S0 to be approximately 0, the light condensing power of the region S1 to be positive, and the light condensing power of the region S2 to be negative.

Third Embodiment

Figure 10A:
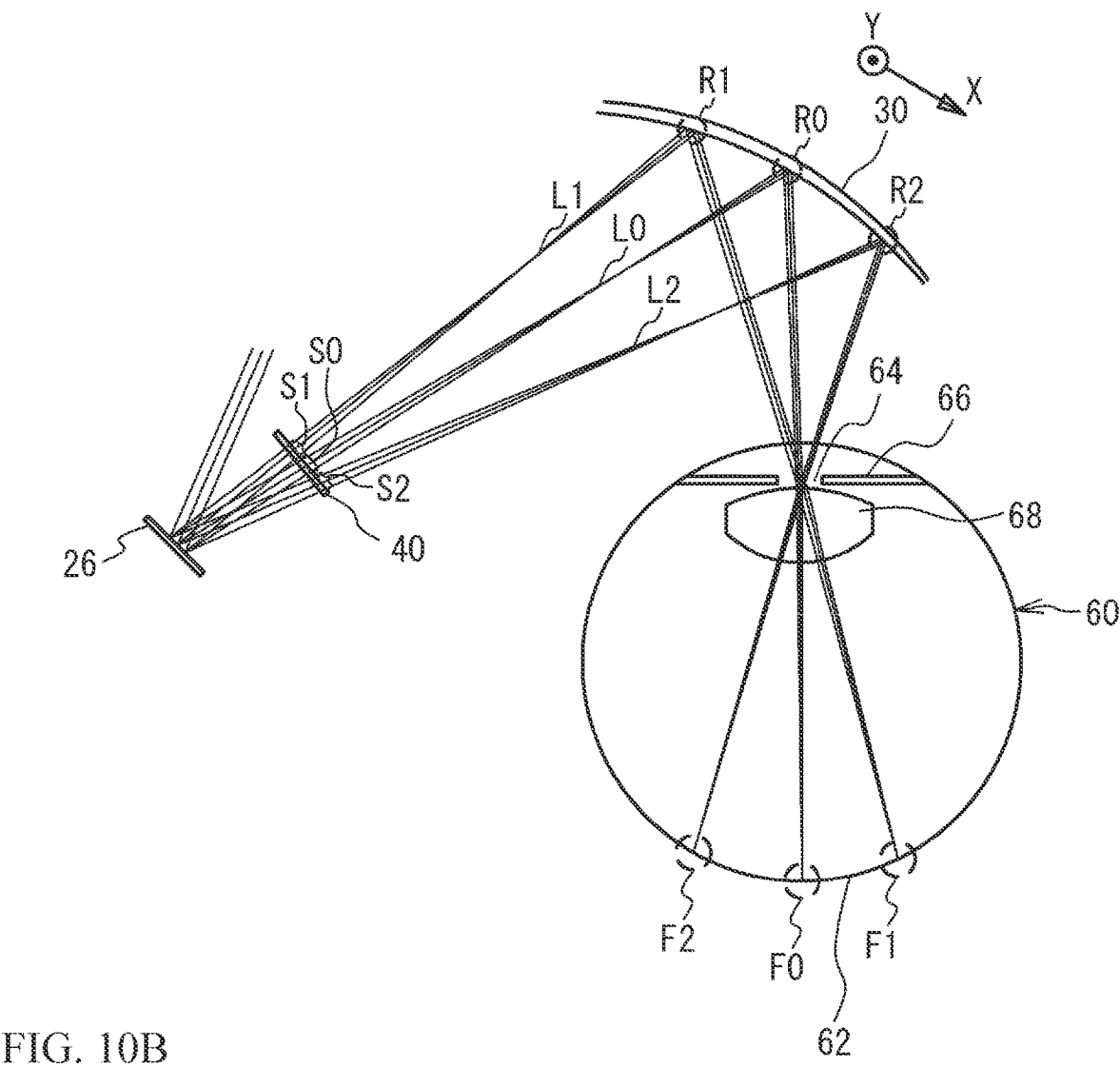
FIG. 10A illustrates a light path of a laser beam in an image projection device in accordance with a third embodiment.
Figure 10B:
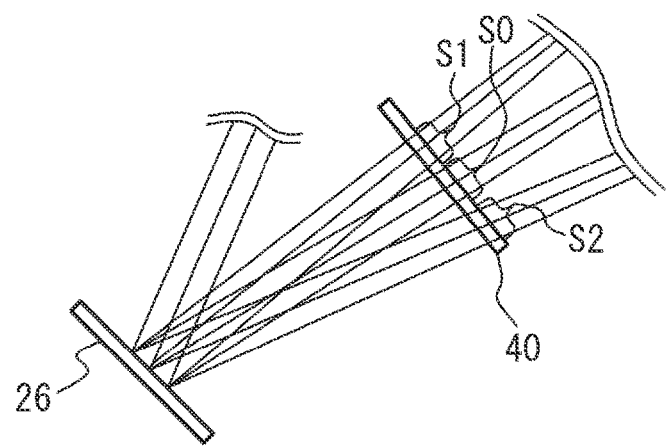
FIG. 10B is an enlarged view of the vicinity of a transmissive diffraction grating in FIG. 10A.

An image projection device of a third embodiment is the same as the image projection device 100 of the first embodiment except that a transmissive diffraction grating 40 is used instead of the reflection mirror 28. FIG. 10A illustrates a light path of a laser beam in the image projection device in accordance with the third embodiment, and FIG. 10B is an enlarged view of the vicinity of the transmissive diffraction grating in FIG. 10A. As illustrated in FIG. 10A and FIG. 10B, the image projection device of the third embodiment includes the transmissive diffraction grating 40 instead of the reflection mirror 28, and the light beam L0 through the light beam L2 scanned by the scan mirror 26 respectively pass through the region S0 through the region S2 of the transmissive diffraction grating 40 and then enter the projection mirror 30.

Figure 11:
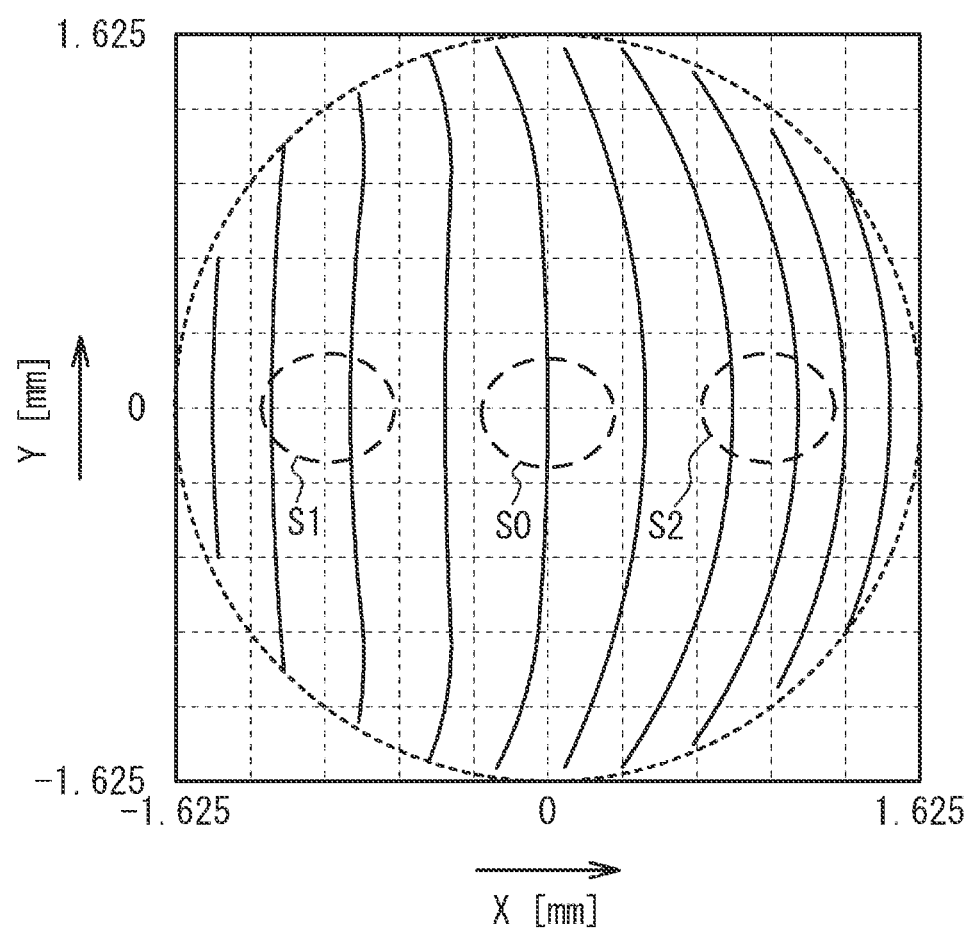
FIG. 11 illustrates equiphase lines of the transmissive diffraction grating included in the image projection device of the third embodiment.

FIG. 11 illustrates equiphase lines of the transmissive diffraction grating of the image projection device in accordance with the third embodiment. In FIG. 11, the interval between lines is 7.5×2 π rad. The interval between the equiphase lines corresponds to the pitch of the transmissive diffraction grating 40. The use of the transmissive diffraction grating 40 also allows the light condensing power of the region S0 to be approximately 0, the light condensing power of the region S1 to be positive, and the light condensing power of the region S2 to be negative.

As in the first through third embodiments, the optical component that reflects the light beam L0 through the light beam L2 scanned by the scan mirror 26 or allows the light beam L0 through the light beam L2 scanned by the scan mirror 26 to pass therethrough may be the reflection mirror 28, the reflection type diffraction grating 38, or the transmissive diffraction grating 40. When the optical component is the reflection type diffraction grating 38 or the transmissive diffraction grating 40, the pitch in the region S1 is configured to be greater than the pitch in the region S2. This configuration allows the light condensing power in the region S1 to be greater than the light condensing power in the region S2. In addition, the use of the reflection type diffraction grating 38 or the transmissive diffraction grating 40 as the optical component allows the light condensing power to be more precisely configured. The light condensing powers of the reflection type diffraction grating 38 and the transmissive diffraction grating 40 depend on the wavelength. Thus, the light beam L0 through the light beam L2 are preferably a light of a single wavelength. When the light beam L0 through the light beam L2 contain a light of a plurality of wavelengths, diffractive elements corresponding to respective wavelengths are preferably stacked.

That is, in the second embodiment, the reflection type diffraction grating 38 has a phase distribution with different phase pitches corresponding to the change in the curvature of the free curved surface of the projection mirror 30. The phase pitches of the reflection type diffraction grating 38 are configured so that the light beam L1 reflected by the region S1, having a wide phase pitch, of the reflection type diffraction grating 38 is emitted to the region R1 of the projection mirror 30 of which the curvature is less than the curvature of the region R2 of the projection mirror 30 irradiated with the light beam L2 reflected by the region S2 having a narrow phase pitch. This configuration allows the light beam L0 through the light beam L2 to focus near the retina 62 as illustrated in FIG. 8A. As described in the first embodiment, since the light beam blocking unit 24 is located between the lens 22 and the scan mirror 26, the diameter of the laser beam 50 to enter the scan mirror 26 is configured to be an appropriate diameter, and the optical intensity at the edge of the laser beam 50 (the intensity at the edge of the eye) is increased. Thus, a good image is provided to the user.

In addition, in the third embodiment, the transmissive diffraction grating 40 has a phase distribution with different pitches corresponding to the change in the curvature of the free curved surface of the projection mirror 30. The phase pitches of the transmissive diffraction grating 40 are configured so that the light beam L1 that has passed through the region S1, having a wide phase pitch, of the transmissive diffraction grating 40 is emitted to the region R1 of the projection mirror 30 of which the curvature is less than the curvature of the region R2 of the projection mirror 30 irradiated with the light beam L2 that has passed through the region S2 having a narrow phase pitch. This configuration allows the light beam L0 through the light beam L2 to focus near the retina 62 as illustrated in FIG. 10A. As described in the first embodiment, since the light beam blocking unit 24 is located between the lens 22 and the scan mirror 26, the diameter of the laser beam 50 to enter the scan mirror 26 is configured to be an appropriate diameter, and the optical intensity at the edge of the laser beam 50 (the intensity at the edge of the pupil) is increased. Therefore, a good image is provided to the user.

The first through third embodiments have described a case where the curvature of the projection mirror 30 changes in the X direction as an example, but the projection mirror 30 may be a diffractive element. To allow the light beam L0 through the light beam L2 to pass through the pupil 64, the light condensing power of the projection mirror 30 in the region R1 is preferably less than the light condensing power of the projection mirror 30 in the region R2. In addition, the projection mirror 30 may be a half mirror that allows the light in the eye direction of the eye ball 60 to pass therethrough, or may be a total reflection mirror that allows no light to pass therethrough. When the projection mirror 30 is a half mirror, the real image in the eye direction is allowed to pass through the projection mirror 30 and to be recognized together with the image by the laser beam 50, while when the projection mirror 30 is a total reflection mirror, only the image by the laser beam 50 can be visually recognized.

The optical systems of the light beam L0 through the light beam L2 are substantially symmetrical about the Y-axis direction. Thus, the light condensing powers at a pair of positions in the optical component corresponding to a pair of positions in the projection mirror 30 that is symmetrical with respect to the line that passes through the position corresponding to the center of the image in the projection mirror 30 and extending in the X direction are preferably practically the same. For example, the curvatures at the positions that are symmetrical about the line (the X-axis) of Y=0 are the same in FIG. 4. In FIG. 9 and FIG. 11, the pitches of the diffractive element that is symmetrical about the line of Y=0 are the same.

Fourth Embodiment

Figure 12:
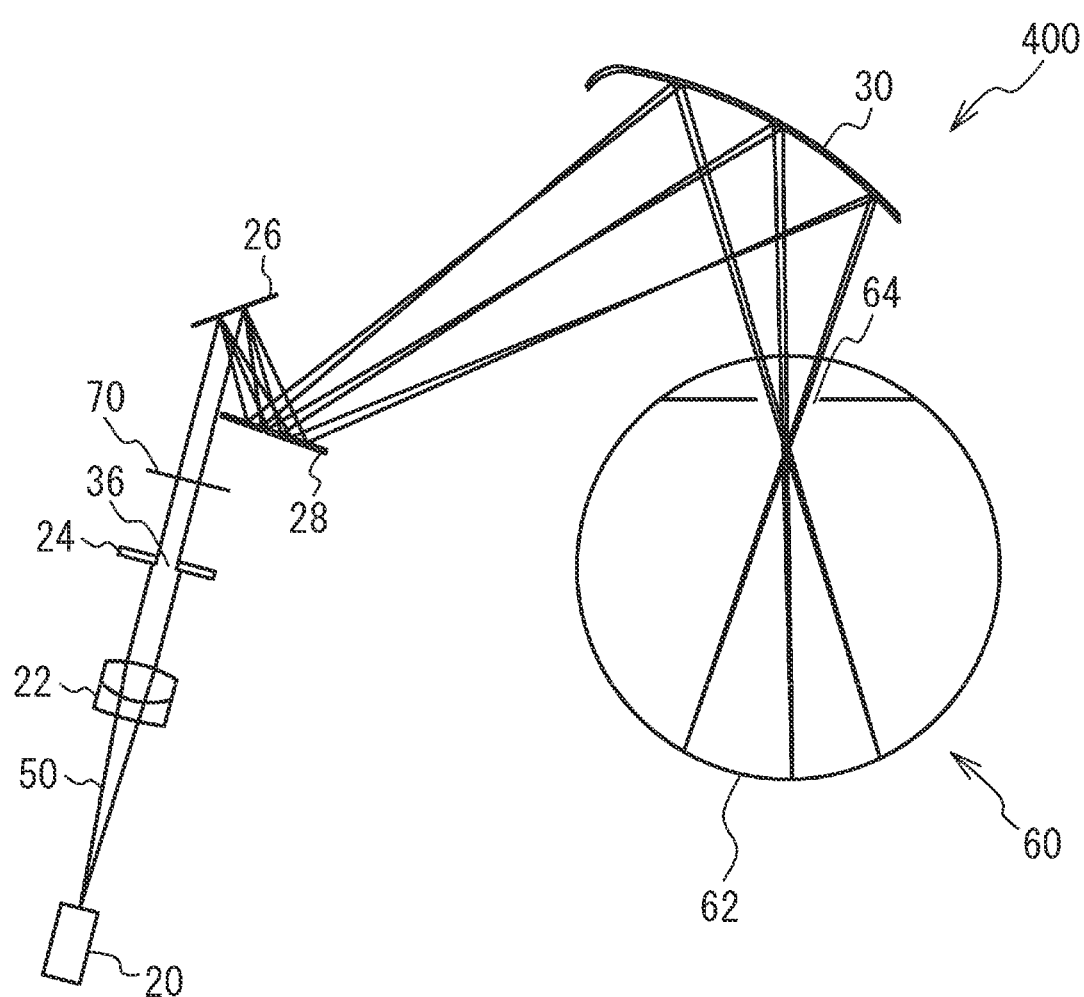
FIG. 12 is an enlarged view of a part of an image projection device in accordance with a fourth embodiment as viewed from above.

FIG. 12 is an enlarged view of a part of an image projection device in accordance with a fourth embodiment as viewed from above. As illustrated in FIG. 12, an image projection device 400 of the fourth embodiment includes a neutral density filter 70, which reduces the intensity of the laser beam 50, on the light path of the laser beam 50 between the lens 22 and the scan mirror 26 in addition to the light beam blocking unit 24. The neutral density filter 70 is, for example, an optical coated resin member. Other structures are the same as the image projection device 100 of the first embodiment.

In the fourth embodiment, the neutral density filter 70 is located on the light path of the laser beam 50 between the light source 20 and the eye ball 60. There is a limit to adjusting the intensity of the laser beam 50 by electrically controlling the light source 20. However, the provision of the neutral density filter 70 in the light path of the laser beam 50 allows the laser beam 50 with an appropriate intensity to be emitted to the retina 62. This configuration allows an image with an appropriate brightness to be provided to the user.

In the fourth embodiment, the neutral density filter 70 is located further downstream than the light beam blocking unit 24 in the traveling direction of the laser beam 50, but the neutral density filter 70 may be located further upstream than the light beam blocking unit 24. The neutral density filter 70 is located between the light source 20 and the scan mirror 26, but may be located at any position between the light source 20 and the eye ball 60 as long as it is located on the light path of the laser beam 50. For example, the neutral density filter 70 may be located between the scan mirror 26 and the reflection mirror 28, between the reflection mirror 28 and the projection mirror 30, between the projection mirror 30 and the eye ball 60, on the scanning surface of the scan mirror 26, on the reflection surface of the reflection mirror 28, the reflection surface of the projection mirror 30, or at two or more of these locations. However, the neutral density filter 70 is preferably located between the lens 22 and the scan mirror 26 as in the fourth embodiment. This is because since the laser beam 50 that has been converted into a substantially parallel light by the lens 22 and has a relatively large diameter passes through the neutral density filter 70, even when the neutral density filter 70 has an in-plane distribution, the effect of the in-plane distribution is reduced. In addition, when the neutral density filter 70 is located further downstream than the scan mirror 26 in the traveling direction of the laser beam 50, since the laser beam 50 that has been scanned by the scan mirror 26 across the wide area of the neutral density filter 70 enters the neutral density filter 70, the effect of the in-plane distribution of the neutral density filter 70 is large. However, the neutral density filter 70 located between the lens 22 and the scan mirror 26 causes the laser beam 50 to enter only a certain area of the neutral density filter 70, thereby reducing the effect of the in-plane distribution.

The first through fourth embodiments have described, as an example, a case where the image projection device is a spectacle-type HMD, but the image projection device may be other than the HMD. In addition, a case where an image is projected on the retina 62 of one of the eye balls 60 has been described, but the image may be projected onto the retinas 62 of both eye balls 60. In addition, a case where the scan unit is the scan mirror 26 has been described as an example, but the scan mirror may be other components as long as it can scan a light beam. For example, the scan unit may be other components such as Potassium Tantalum Niobium Oxide (KTN) crystal that is an electro-optic material. The laser beam has been described as an example of the light beam, but the light beam may be a light other than the laser beam. In addition, both the light condensing powers in the region S1 and the region S2 of the optical component may be positive or negative. A case where the direction in which the light beam L0 through the light beam L2 enter the projection mirror 30 is the horizontal direction has been described, but the light beam L0 through the light beam L2 may enter the projection mirror 30 in the vertical direction or in an oblique direction.

Although the embodiments of the present invention has been described in detail, the present invention is not limited to a certain embodiment, and it should be understood that the various change, substitutions, and alterations could be made hereto without departing from the scope of the invention.

The invention claimed is:

1. An image projection device comprising:
a light source configured to emit a light beam;
an image input unit to which image data is input;
a control unit configured to generate an image light beam based on the image data that has been input and control emission of the image light beam from the light source;
a lens configured to convert the image light beam emitted from the light source into a substantially parallel light;
a scanner configured to scan the image light beam that has passed through the lens;
an optical component configured to reflect the image light beam scanned by the scanner or allow the image light beam scanned by the scanner to pass therethrough;
a projection mirror configured to irradiate a retina of an eye ball of a user with the image light beam that has been reflected by or has passed through the optical component to project an image on the retina;
a light beam blocking unit that is located on a light path of the image light beam between the scanner and the lens, and has an aperture that blocks a part of the image light beam and allows a remaining part of the image light beam to pass therethrough, wherein
the projection mirror has a first region and a second region that has a larger light condensing power than the first region, and
a light condensing power in a third region of the optical component is greater than a light condensing power in a fourth region of the optical component, the third region reflecting a first light beam of the image light beam scanned by the scanner or allowing the first light beam to pass therethrough, the first light beam being to be emitted to the first region, the fourth region reflecting a second light beam of the image light beam scanned by the scanner or allowing the second light beam to pass therethrough, the second light beam being to be emitted to the second region.

2. The image projection device according to claim 1, wherein the optical component is a reflection mirror, and a curvature of the reflection mirror in the third region is greater than a curvature of the reflection mirror in the fourth region.

3. The image projection device according to claim 1, wherein the optical component is a diffraction grating.

4. The image projection device according to claim 1 wherein
the first region and the second region are located at both sides of a position corresponding to a center of the image in the projection mirror in an incident direction of the image light beam, and
the first region is located closer to the optical component than the second region in the incident direction of the image light beam.

5. The image projection device according to claim 1, further comprising a neutral density filter that is located on a light path of the image light beam between the light source and the eye ball, and reduces an intensity of the image light beam.

6. The image projection device according to claim 5, wherein the neutral density filter is located between the lens and the scanner.

7. An image projection device comprising:
a light source configured to emit a light beam;
an image input unit to which image data is input;
a control unit configured to generate an image light beam based on the image data that has been input and control emission of the image light beam from the light source;
a lens configured to convert the image light beam emitted from the light source into a substantially parallel light;
a scanner configured to scan the image light beam that has passed through the lens;
a reflection mirror configured to reflect the image light beam scanned by the scanner;
a projection mirror configured to irradiate a retina of an eye ball of a user with the image light beam reflected by the reflection mirror to project an image on the retina; and
a light beam blocking unit that is located on a light path of the image light beam between the scanner and the lens, and has an aperture that blocks a part of the image light beam and allows a remaining part of the image light beam to pass therethrough, wherein
a surface of the projection mirror has a free curved surface having regions with different curvatures,
a surface of the reflection mirror has a free curved surface including a concave curved surface and a convex curved surface, and
in the projection mirror, a region that reflects an image light beam reflected by the concave curved surface is located closer to a position into which the image light beam enters than a region that reflects an image light beam reflected by the convex curved surface.

8. The image projection device according to claim 7, further comprising a neutral density filter that is located on a light path of the image light beam between the light source and the eye ball, and reduces an intensity of the image light beam.

9. An image projection device comprising:
a light source configured to emit a light beam;
an image input unit to which image data is input;
a control unit configured to generate an image light beam based on the image data that has been input and control emission of the image light beam from the light source;
a lens configured to convert the image light beam emitted from the light source into a substantially parallel light;
a scanner configured to scan the image light beam that has passed through the lens;
a reflection mirror configured to reflect the image light beam scanned by the scanner;
a projection mirror configured to irradiate a retina of an eye ball of a user with the image light beam reflected by the reflection mirror to project an image on the retina; and
a light beam blocking unit that is located on a light path of the image light beam between the scanner and the lens, and has an aperture that blocks a part of the image light beam and allows a remaining part of the image light beam to pass therethrough, wherein
a surface of the projection mirror has a free curved surface having regions with different curvatures, the reflection mirror includes a reflection type diffractive element having a phase distribution with different phase pitches, and in the projection mirror, a region that reflects an image light beam reflected by a region having a phase distribution with a large light condensing power in the reflection type diffractive element is located closer to a position into which the image light beam enters than a region that reflects an image light beam reflected by a region having a phase distribution with a small light condensing power in the reflection type diffractive element.

10. The image projection device according to claim 9, further comprising a neutral density filter that is located on a light path of the image light beam between the light source and the eye ball, and reduces an intensity of the image light beam.

11. An image projection device comprising:

a light source configured to emit a light beam;

an image input unit to which image data is input;

a control unit configured to generate an image light beam based on the image data that has been input and control emission of the image light beam from the light source;

a lens configured to convert the image light beam emitted from the light source into a substantially parallel light;

a scanner configured to scan the image light beam that has passed through the lens;

an optical component configured to allow the image light beam scanned by the scanner to pass therethrough;

a projection mirror configured to irradiate a retina of an eye ball of a user with the image light beam that has passed through the optical component to project an image on the retina; and a light beam blocking unit that is located on a light path of the image light beam between the scanner and the lens; and has an aperture that blocks a part of the image light beam and allows a remaining part of the image light beam to pass therethrough, wherein a surface of the projection mirror has a free curved surface having regions with different curvatures, the optical component includes a transmissive diffractive element having a phase distribution with different phase pitches, and in the projection mirror, a region that reflects an image light beam that has passed through a region having a large light condensing power in the transmissive diffractive element is located closer to a position into which the image light beam enters than a region that reflects an image light beam that has passed through a region having a small light condensing power in the transmissive diffractive element.

12. The image projection device according to claim 11, further comprising a neutral density filter that is located on a light path of the image light beam between the light source and the eye ball, and reduces an intensity of the image light beam.

\* \* \* \* \*